(12) United States Patent
Furubayashi

(10) Patent No.: US 9,282,206 B2
(45) Date of Patent: Mar. 8, 2016

(54) PORTABLE INFORMATION TERMINAL AND RECORDING MEDIUM

(71) Applicant: KONICA MINOLTA, INC., Marunouchi (JP)

(72) Inventor: Toshiya Furubayashi, Takarazuka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/566,006

(22) Filed: Dec. 10, 2014

(65) Prior Publication Data

US 2015/0172482 A1 Jun. 18, 2015

(30) Foreign Application Priority Data

Dec. 17, 2013 (JP) .................................. 2013-259832

(51) Int. Cl.
*H04N 1/00* (2006.01)
*G06F 3/12* (2006.01)
*G06F 3/048* (2013.01)

(52) U.S. Cl.
CPC ............ *H04N 1/00413* (2013.01); *G06F 3/048* (2013.01); *G06F 3/1205* (2013.01); *G06F 3/1253* (2013.01); *G06F 3/1292* (2013.01); *H04N 1/00244* (2013.01); *H04N 1/00307* (2013.01); *H04N 1/00474* (2013.01); *H04N 2201/0094* (2013.01)

(58) Field of Classification Search
USPC .................................. 719/328; 358/1.13, 504
See application file for complete search history.

(56) References Cited

U.S. PATENT DOCUMENTS

| 2010/0299597 | A1 | 11/2010 | Shin et al. | |
| 2012/0243043 | A1* | 9/2012 | Asai | 358/1.15 |
| 2013/0063619 | A1* | 3/2013 | Asai | 348/222.1 |
| 2014/0310728 | A1* | 10/2014 | Fang et al. | 719/328 |
| 2015/0029530 | A1* | 1/2015 | Asai | 358/1.13 |
| 2015/0029550 | A1* | 1/2015 | Asai | 358/1.15 |

FOREIGN PATENT DOCUMENTS

| JP | 2006-185009 A | 7/2006 |
| JP | 2007-011035 A | 1/2007 |
| JP | 2012-212348 A | 11/2012 |
| JP | 2012-530385 A | 11/2012 |

* cited by examiner

*Primary Examiner* — Jerome Grant, II
(74) *Attorney, Agent, or Firm* — Buchanan Ingersoll & Rooney PC

(57) ABSTRACT

Provided is a portable information terminal capable of selectively displaying a display screen based on a single application, from among display screens of a plurality of applications, the portable information terminal including: a display unit which displays a display screen of a cooperation source application; a generation unit which generates, based on a start instruction which instructs to start a cooperation destination application, an image for background for the cooperation destination application by capturing the display screen of the cooperation source application. The cooperation destination application has, as a main display area, a display area smaller than an entire display area of the display screen of the cooperation source application. The display unit displays the image for background given from the cooperation source application to the cooperation destination application, in a peripheral area of the main display area of the cooperation destination application.

13 Claims, 15 Drawing Sheets

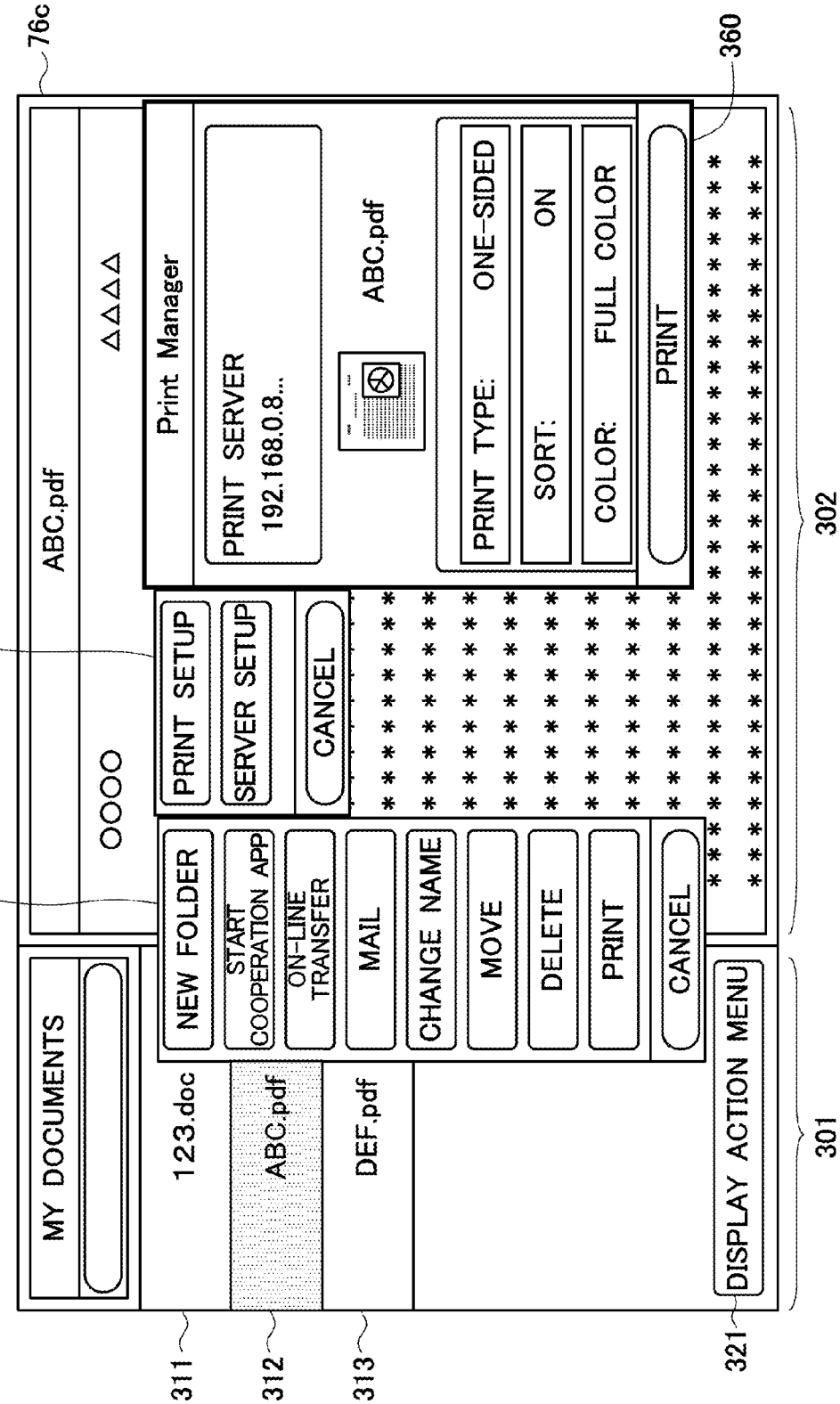

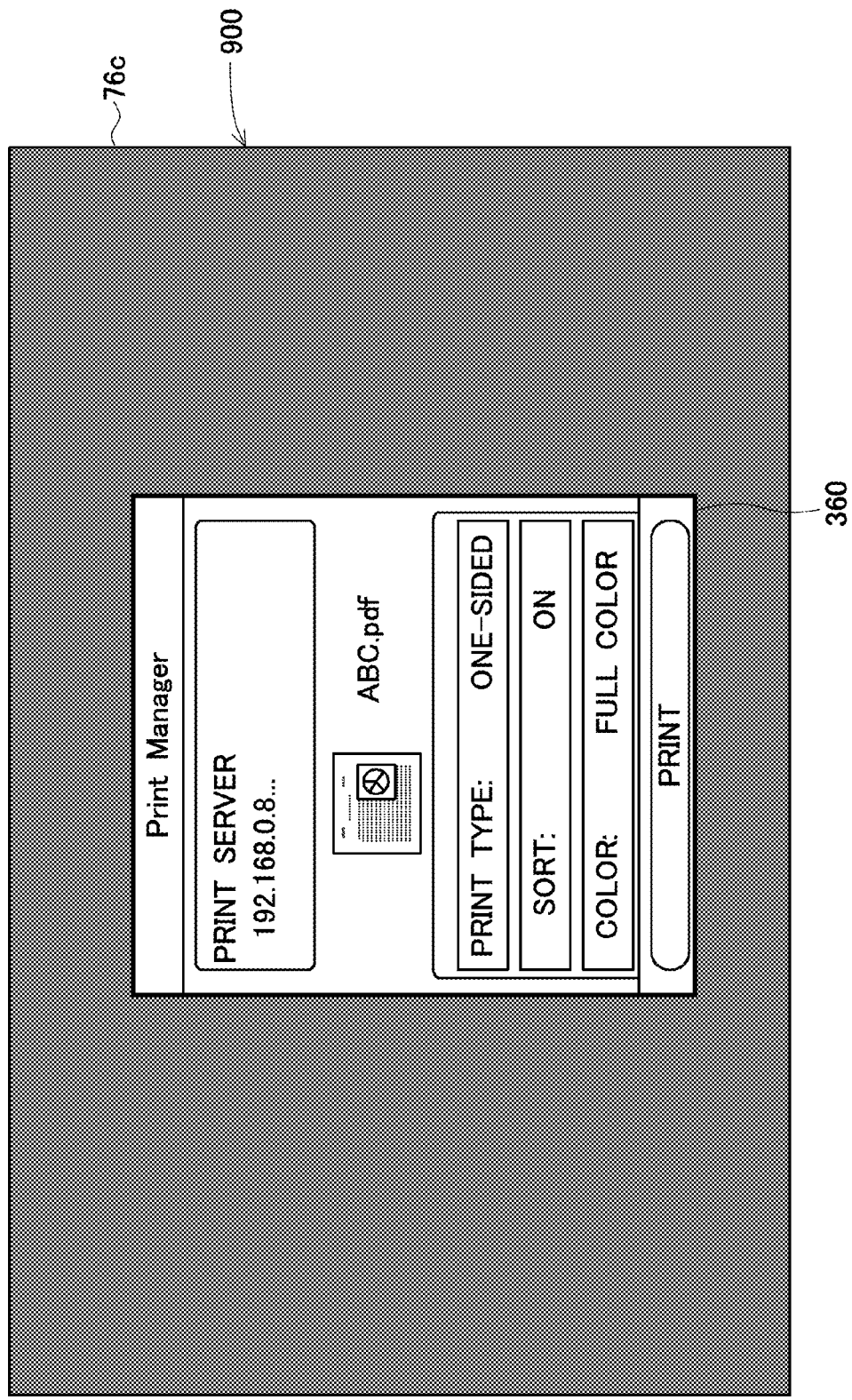

PORTABLE INFORMATION TERMINAL AND RECORDING MEDIUM

This application is based on Japanese Patent Application No. 2013-259832 filed on Dec. 17, 2013, the contents of which are hereby incorporated by reference.

BACKGROUND OF THE INVENTION

1. Field of the Invention

The present invention relates to a portable information terminal (including a tablet terminal, a smartphone, and the like) and a technology related thereto.

2. Description of the Background Art

There is a technology in which a plurality of application programs (also simply referred to as applications) operate in cooperation with each other (refer to Japanese Patent Application Laid-Open No. 2012-212348).

For example, Japanese Patent Application Laid-Open No. 2012-212348 describes a technology in which a plurality of applications executed in a portable telephone share image data to perform a cooperating operation. In more detail, Japanese Patent Application Laid-Open No. 2012-212348 describes a technology in which image data is shared by two applications (a scan/print application and a gallery application (image viewer application)) which are operating on "Android (trademark) OS."

Because of the fact that a portable information terminal (tablet terminal and the like) has a relatively small display unit or other reasons, only one of a plurality of applications is basically in an active state in the portable information terminal. In other words, on a portable information terminal, only one of display screens of the plurality of applications which is under the management of a single application is selectively (exclusively) displayed.

Alternatively, on such a portable information terminal, when a plurality of applications operate in cooperation with each other, the display screen of a cooperation source application is, in some cases, displayed by using the whole of the display unit (touch panel or the like) while the display screen of a cooperation destination application is displayed by using only a part of the display unit. For example, in the cooperation destination application, there is, in some cases, displayed an image (an image having a size of approximately a fraction of the entire screen) on only a part of the display unit, wherein the image has a size of approximately ½ (half) to ⅓ (one-third) of the display unit in the horizontal direction and is a slightly small in the vertical direction (see FIG. 15). Such a display can be performed in consideration of unity of screen design and the like. In more detail, in some cases, in the cooperation destination application, there is used a screen (setting screen or the like) with a design similar to the design of a screen (small screen) of a part of the display screen of the cooperation source application. In such a case, a screen (relatively small screen) which has the same size as that of the small screen used in the cooperation source application is used as a major display screen of the cooperation destination application.

In such a technology, for example, a major display screen of the cooperation destination application is displayed in a relatively small area (partial area) on the entire screen of the display unit of the portable information terminal, and a monochrome black background image is also displayed in the peripheral area of the partial area (see FIG. 15).

However, when such a monochrome black screen is displayed, not only a user gets a dry impression but also cooperation between two applications is not sufficiently conveyed to the user.

SUMMARY OF THE INVENTION

An object of the present invention is to provide a technology in which the cooperation between two applications can be understandably presented to a user.

A first aspect of the present invention provides a portable information terminal which is capable of selectively displaying a display screen based on a single application from among display screens of a plurality of applications, the portable information terminal including a display unit that displays a display screen of a cooperation source application, a receiving unit that receives a start instruction which instructs to start a cooperation destination application cooperating with the cooperation source application, and a generation unit that generates, based on the start instruction, an image for background for the cooperation destination application by capturing the display screen of the cooperation source application, wherein the cooperation destination application has, as a main display area, a display area which is smaller than an entire display area of the display screen of the cooperation source application, and the display unit displays the image for background given from the cooperation source application to the cooperation destination application at a time when the cooperation destination application starts, in a peripheral area of the main display area of the cooperation destination application after the cooperation destination application starts.

A second aspect of the present invention provides a non-transitory computer-readable recording medium storing a program to be executed on a portable information terminal which is capable of selectively displaying a display screen based on a single application from among display screens of a plurality of applications, the program causing a computer to execute the steps of (a) displaying a display screen in a cooperation source application on a display unit of the portable information terminal, the cooperation source application being the program, (b) generating an image for background for a cooperation destination application by capturing the display screen in the cooperation source application, based on a start instruction which instructs to start the cooperation destination application cooperating with the cooperation source application, and (c) giving the image for background to the cooperation destination application as an image for composition to be compositely displayed in the peripheral area of the main display area of the cooperation destination application at a time when the cooperation destination application starts, the cooperation destination application having, as a main display area, a display area which is smaller than an entire display area of the display screen in the cooperation source application.

A third aspect of the present invention provides a non-transitory computer-readable recording medium storing a program to be executed on a portable information terminal which is capable of selectively displaying a display screen based on a single application from among display screens of a plurality of applications, the program causing a computer to execute the steps of (a) receiving an image for background which is generated for the program by capturing a display screen in a cooperation source application which cooperates with the program and is different from the program, from the cooperation source application at a time when the program, which is a cooperation destination application, starts, and (b) displaying the image for background in a peripheral area of a main display area of the program after start of the program which has, as the main display area, a display area which is smaller than an entire display area of the display screen in the cooperation source application.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing a display screen according to a modified example; and FIG. 15 is a diagram showing a display screen (the display screen of a cooperation destination application) according to a comparative example.

DESCRIPTION OF THE PREFERRED EMBODIMENTS

An embodiment of the present invention will be described below with reference to the drawings.

<1. First Embodiment>
<1-1. Overview of System>

Figure 1:
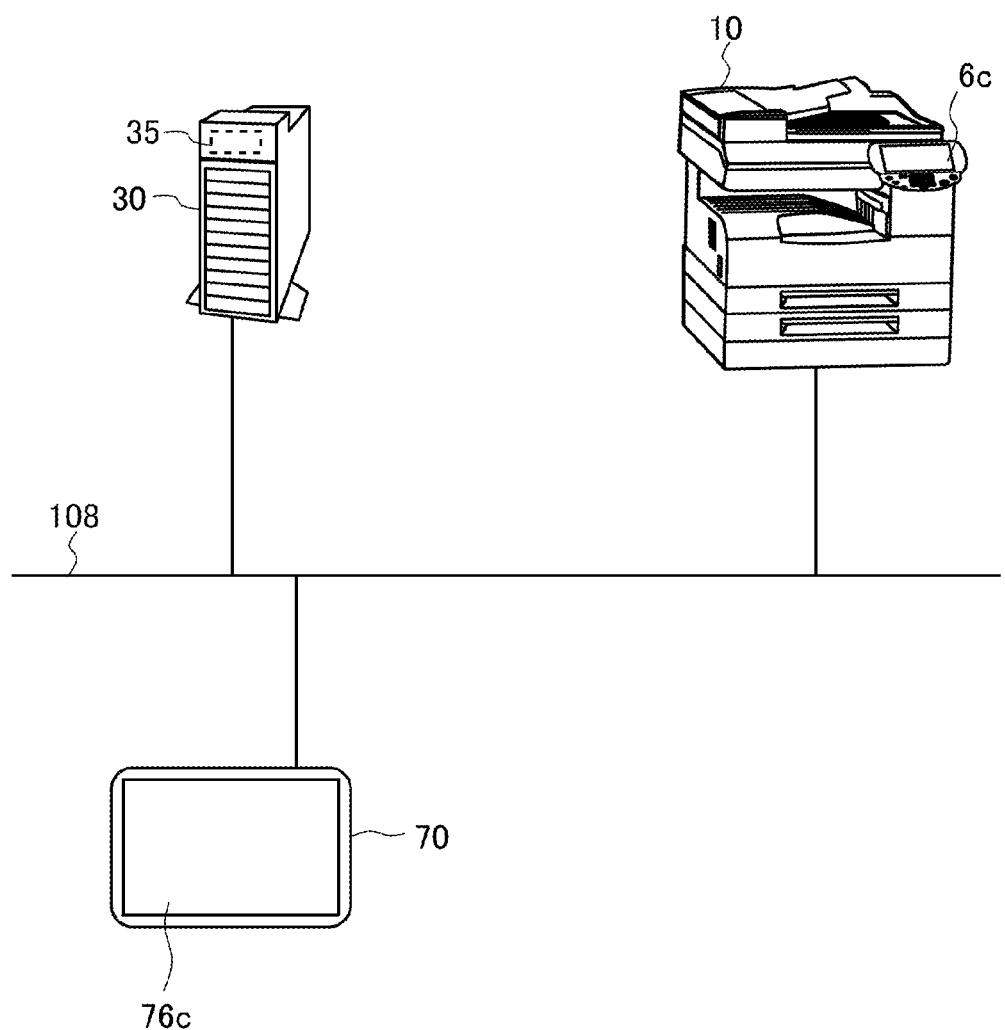
FIG. 1 is a conceptual diagram showing an overview of an image forming system 1 according to a first embodiment.

FIG. 1 is a conceptual diagram showing an overview of an image forming system 1.

As shown in FIG. 1, the image forming system 1 includes an image forming apparatus 10 and a portable information terminal 70. Here, as the image forming apparatus 10, an MFP (Multi-Functional Peripheral) is exemplified.

The image forming system 1 further includes a server computer 30. The computer 30 is a server computer having a print server function. The, computer 30 also has a pull-print server function. The computer 30 is also referred to as "print server", "pull-print server", or simply "server".

The MFP 10, the server 30, and the portable information terminal 70 are connected to one another through a network 108 and can perform network communication. The network 108 includes a LAN, a WAN, the Internet, or the like. A form of the connection to the network 108 may be a cable connection or a wireless connection.

The image forming system 1 functions as a pull-print system which performs a so-called pull-print operation. In the pull-print system, first, after a user gives a print instruction by using the portable information terminal 70 (print request source device), print data is transferred from the portable information terminal 70 to the server (pull-print server) 30, and the print data is once stored in a storage unit 35 (a pull-print storage area to be described later) or the like of the server 30. After that, a user authentication operation is then performed by using an operation input unit or the like of a print output device (MFP 10 or the like), and then the print data is obtained (pulled) from the server 30 to be printed out (printed) by the print output device.

On the image forming system 1, in addition to an ordinary print operation, the above described pull-print operation is performed.

<1-2. Configuration of MFP>

Figure 2:
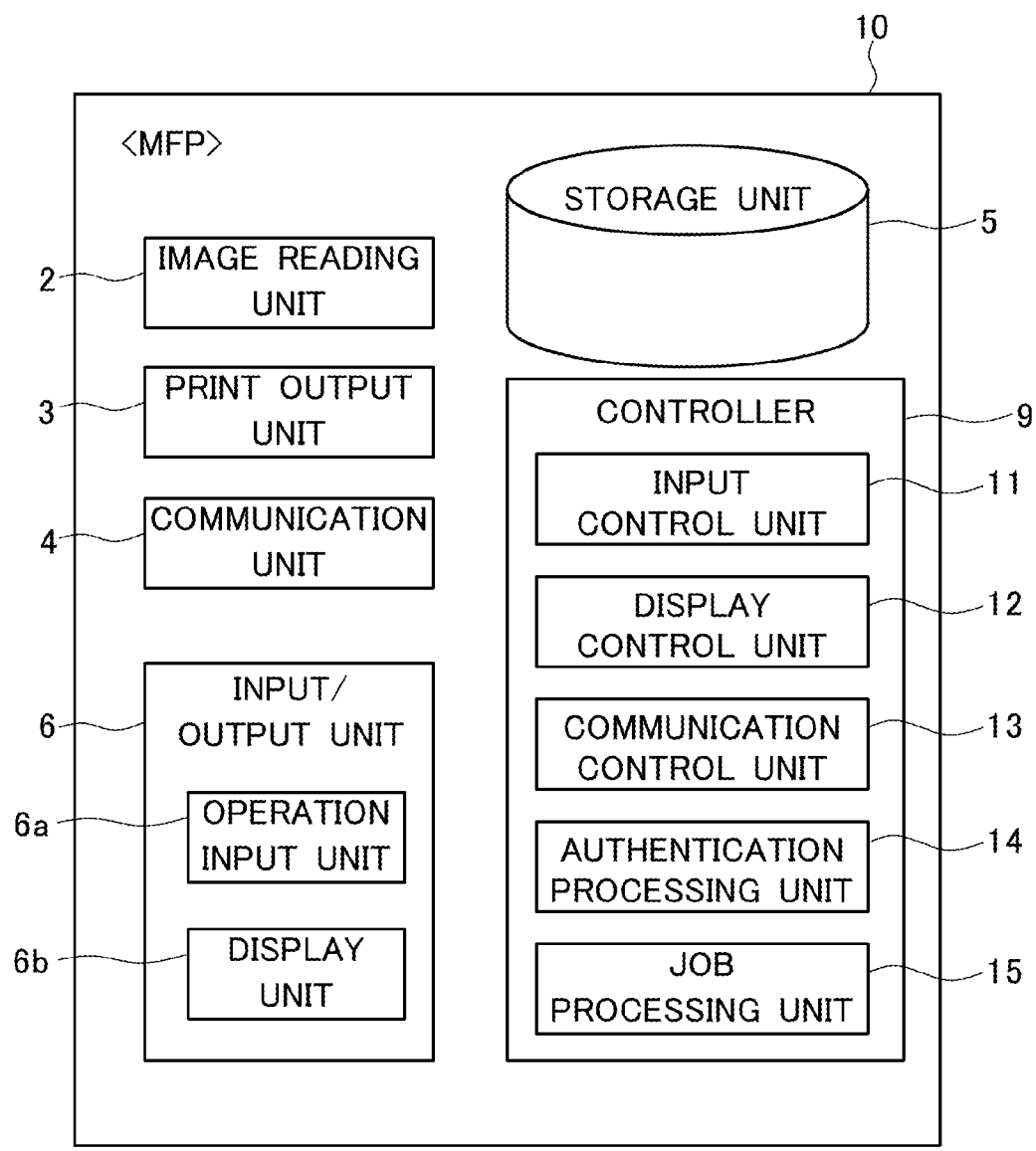
FIG. 2 is a functional block diagram showing a schematic configuration of an MFP (Multi-Functional Peripheral)

FIG. 2 is a functional block diagram showing a schematic configuration of the MFP 10.

As shown in the functional block diagram of FIG. 2, the MFP 10 includes an image reading unit 2, a print output unit 3, a communication unit 4, a storage unit 5, an input/output unit 6, a controller 9, and the like, and makes these units compositely operate to realize various functions. The MFP 10 is also referred to as an image forming apparatus or a print output device.

The image reading unit 2 is a processing unit which optically reads (i.e., scans) a document placed on a predetermined position on the MFP 10 to generate an image data (also referred to as a document image or a scanned image) of the document. The image reading unit 2 is also referred to as a scanning unit.

The print output unit 3 is an output unit which prints out an image on various media such as paper, based on data about a print object.

The communication unit 4 is a processing unit which can perform facsimile communication through a public line or the like. The communication unit 4 can further perform network communication through the network 108. For the network communication, various protocols are used such as TCP/IP (Transmission Control Protocol/Internet Protocol) and FTP (File Transfer Protocol). By using the network communication, the MFP 10 can transmit and receive various data to and from an intended destination.

The storage unit 5 is configured with a storage device such as a hard disk drive (HDD).

The input/output unit 6 includes an operation input unit 6a for receiving an input to the MFP 10 and a display unit 6b for performing display output of various information. In detail, the MFP 10 includes an operation panel 6c (see FIG. 1). The operation panel (touch screen) 6c is configured with a liquid crystal display panel in which a piezoelectric sensor or the like is embedded, and functions as a part of the display unit 6b and also functions as a part of the operation input unit 6a.

The controller 9 is a control device which is installed in the MFP 10 to generally control the MFP 10. The controller 9 is configured as a computer system which includes a CPU, various kinds of semiconductor memories (RAM and ROM), and the like. The controller 9 executes, on the CPU, a predetermined software program (hereinafter also simply referred to as a program) stored in the ROM (for example, EEPROM) to realize various processing units. Note that the program may be installed in the MFP 10 through a portable recording medium such as a USB memory, or a network or the like.

As shown in FIG. 2, the controller 9 realizes various processing units including an input control unit 11, a display control unit 12, a communication control unit 13, an authentication processing unit 14, and a job processing unit 15.

The input control unit 11 is a processing unit which receives an input (operation input) and the like from a user, in cooperation with the input/output unit 6 (operation panel 6c or the like). The input control unit 11 receives a print-out instruction (pull-print operation) of print data stored in the server 30 and other instructions.

The display control unit 12 is a processing unit which controls a display output operation and the like on the display unit 6b (operation panel 6c and the like).

The communication control unit 13 is a processing unit which performs communication with external devices, in cooperation with the communication unit 4.

The authentication processing unit 14 is a processing unit which performs an authentication operation of a user.

The job processing unit 15 is a processing unit which controls processing (for example, processing of printing out on the print output unit 3 and other processing) related to various jobs.

<1-3. Configuration of Portable Information Terminal 70>

Next, the configuration of the portable information terminal 70 will be described.

The portable information terminal 70 is a portable information input/output device which can perform network communication with other devices. Examples of the portable information terminal 70 include a tablet terminal, a smartphone, and the like. The portable information terminal 70 is also simply referred to as a mobile terminal.

Figure 3:
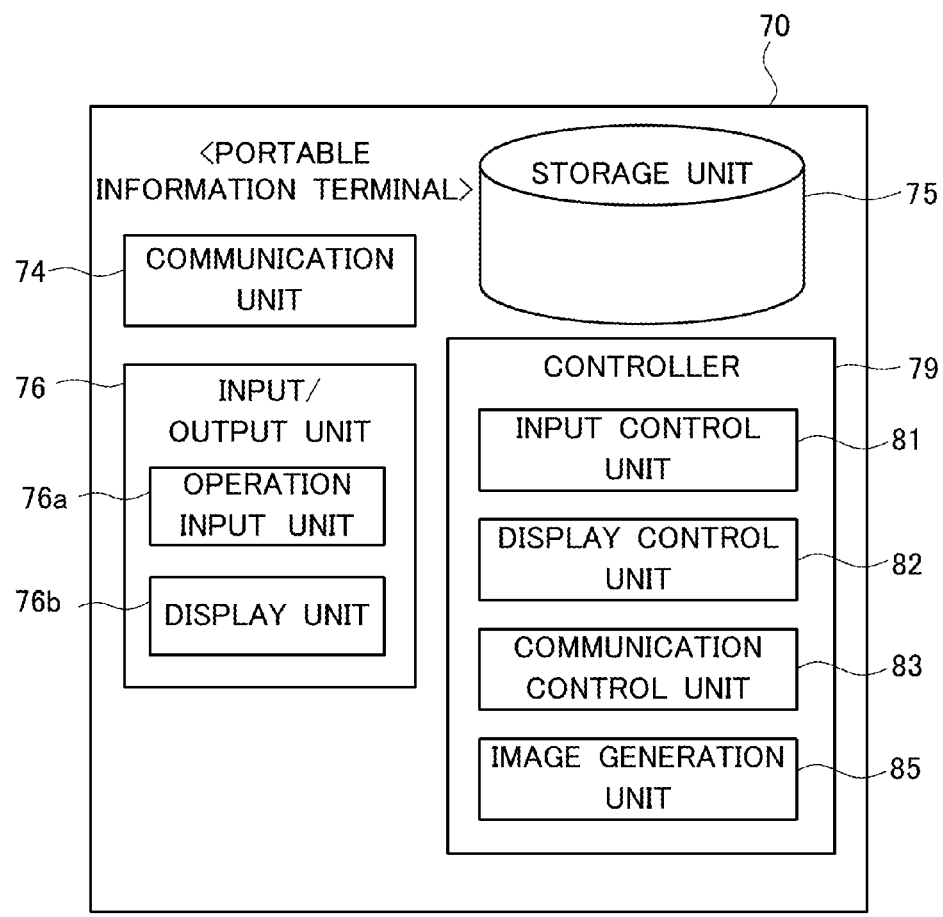
FIG. 3 is a functional block diagram showing a schematic configuration of a portable information terminal.

FIG. 3 is a functional block diagram showing a schematic configuration of the portable information terminal 70.

As shown in the functional block diagram of FIG. 3, the portable information terminal 70 includes a communication unit 74, a storage unit 75, an input/output unit 76, a controller 79, and the like, and makes these units compositely operate to realize various functions.

The communication unit 74 can perform network communication through the network 108. For the network communication, various protocols are used such as TCP/IP (Transmission Control Protocol/Internet Protocol) and the like. By using the network communication, the portable information terminal 70 can transmit and receive various data to and from an intended destination.

The input/output unit 76 includes an operation input unit 76a for receiving an input to the portable information terminal 70 and a display unit 76b for performing display output of various information. On the portable information terminal 70, there is provided a touch screen 76c (see FIG. 1) which is configured with a liquid crystal display panel in which a piezoelectric sensor or the like is embedded. The touch screen 76c functions as a part of the operation input unit 76a, and also functions as a part of the display unit 76b.

The controller 79 performs on a CPU thereof a program stored in the storage unit 75 to realize various processing units. Note that, the program may be downloaded through the network 108 and be installed in the portable information terminal 70. Alternatively, the program may be recorded on various portable recording media (USB memory, and the like) (in other words, various computer-readable non-transitory recording media), and may be read out from the recording medium and be installed in the portable information terminal 70.

In more detail, on the portable information terminal 70, there is installed a predetermined OS (Operating System) (for example, OSs such as "Android (OS)" (registered trademark) and "iOS" (registered trademark)), and a plurality of application software programs (also referred to as applications or the like) can be executed on the OS.

On the OS of the portable information terminal 70, only a single application of a plurality of applications is activated to operate, basically. In other words, the plurality of applications exclusively have active states. In addition, only a display screen under the management of the single application of the plurality of applications is selectively (exclusively) displayed on the touch screen 76c. Briefly speaking, only a display screen of a single application (in the active state) of the plurality of applications is displayed on the touch screen 76c.

The plurality of application programs include an electronic document viewing application 201, a print management application 202, and the like. The electronic document viewing application 201 is an application capable of viewing a plurality of electronic documents, and the print management application 202 is an application for managing a printing operation (including the pull-print operation and the like) of the plurality of electronic documents and the like. The applications 201 and 202 operate in cooperation with each other. Specifically, on an electronic document specified by using the electronic document viewing application 201, the pull-print operation (in more detail, an operation of storing print data in the server 30) is performed by using the print management application 202. The electronic document viewing application 201 is an example of a cooperation source application, and the print management application 202 is an example of a cooperation destination application.

The portable information terminal 70 can display a plurality of electronic documents by executing the electronic document viewing application 201. Further, by executing the print management application 202, it is possible to realize the pull-print operation (in detail, a part of the operation) which relates to the electronic document selected by the electronic document viewing application 201. In more detail, by using the print management application 202, the operation of transferring and storing the print data for pull-print (operation of transferring the print data from the portable information terminal 70 to the server 30, and once storing the print data in the server 30) is performed as a part of the pull-print operation.

By executing the applications 201 and 202, the controller 79 realizes various processing units including an input control unit 81, a display control unit 82, a communication control unit 83, and an image generation unit 85 as shown in FIG. 3.

The input control unit 81 is a processing unit which receives an input (operation input) from the user to the portable information terminal 70, in cooperation with the input/output unit 76 (touch screen 76c or the like).

The display control unit 82 is a processing unit which controls a display output operation and the like on the display unit 76b (touch screen 76c and the like).

The communication control unit 83 is a processing unit which communicates with external devices, in cooperation with the communication unit 74.

The image generation unit 85 is a processing unit which performs an operation of generating a captured image in the cooperation source application 201. As described later, the cooperation destination application 202 which cooperates with the cooperation source application 201 displays a display screen using the captured image and the like on the touch screen 76c, under the control of the display control unit 82 and the like.

<1-4. Configuration of Server>

The server 30 is configured as a computer system (computer).

The server 30 has the storage unit 35 (see FIG. 1). The storage unit 35 has a pull-print storage area for storing print data for the pull-print. The print data for the pull-print transferred from the portable information terminal 70 to the server 30 is stored in the storage unit 35 (in detail, in the pull-print storage area of the storage unit 35). Then, the print data stored in the storage unit 35 is transferred from the storage unit 35 of the server 30 to the MFP 10, in response to an operation input (an input of authentication information or the like) through the operation panel 6c or the like of the MFP 10. By this operation, a print-out operation (pull-print operation) based on the print data is performed on the MFP 10.

<1-5. Operation>

Figure 4:
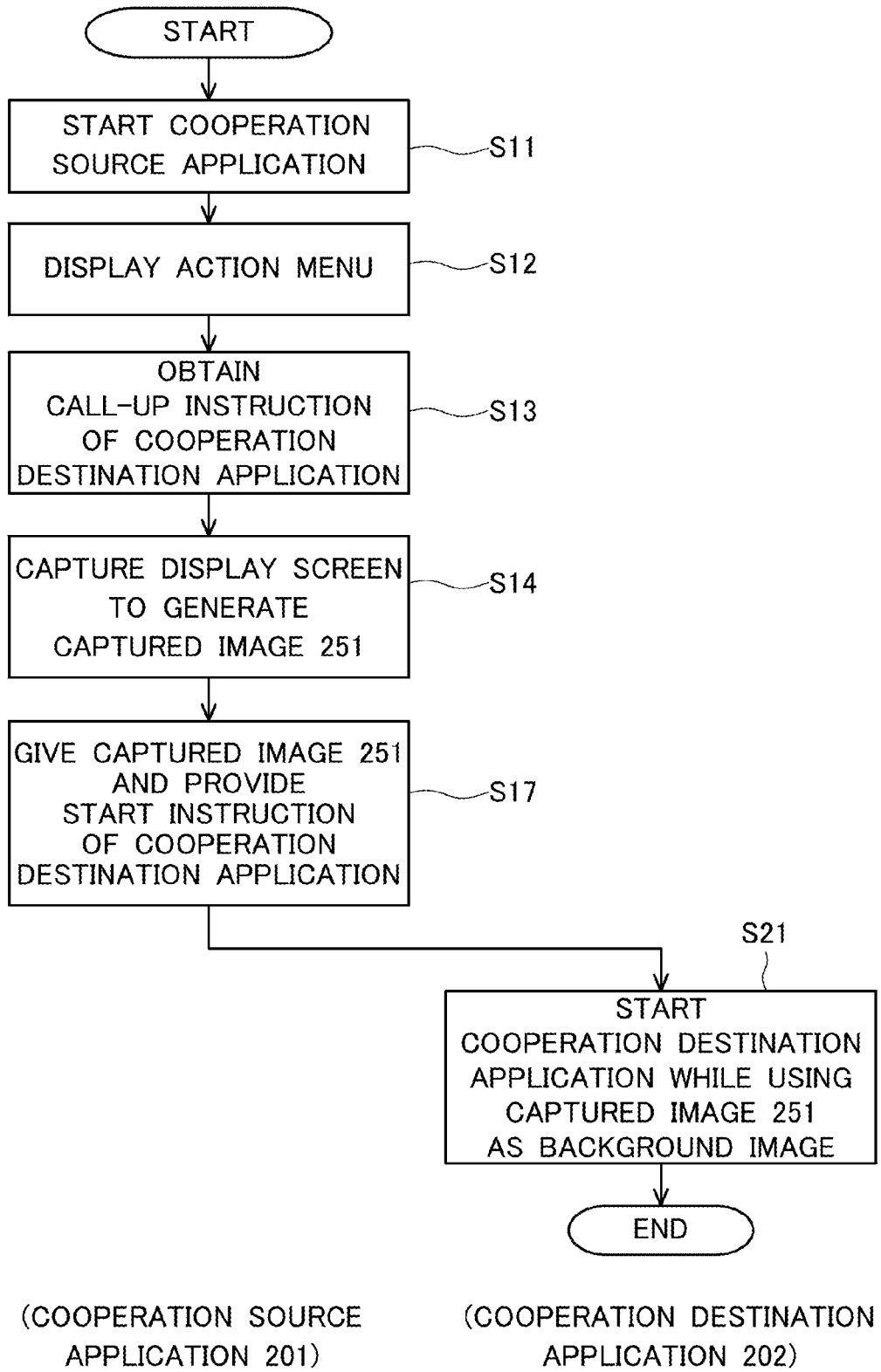
FIG. 4 is a flowchart showing an operation of the portable information terminal.

Next, the operation of the system 1, in particular, the operation of the portable information terminal 70 will be described with reference to FIG. 4 and other figures. FIG. 4 is a flowchart showing the operation of the portable information terminal 70.

First, in response to a start operation of the user, the electronic document viewing application 201 is started on the portable information terminal 70 (step S11). The application 201 has a document content viewing function (preview function) of electronic documents. In detail, the application 201 can selectively display a content of one document of a plurality of electronic documents.

Figure 5:
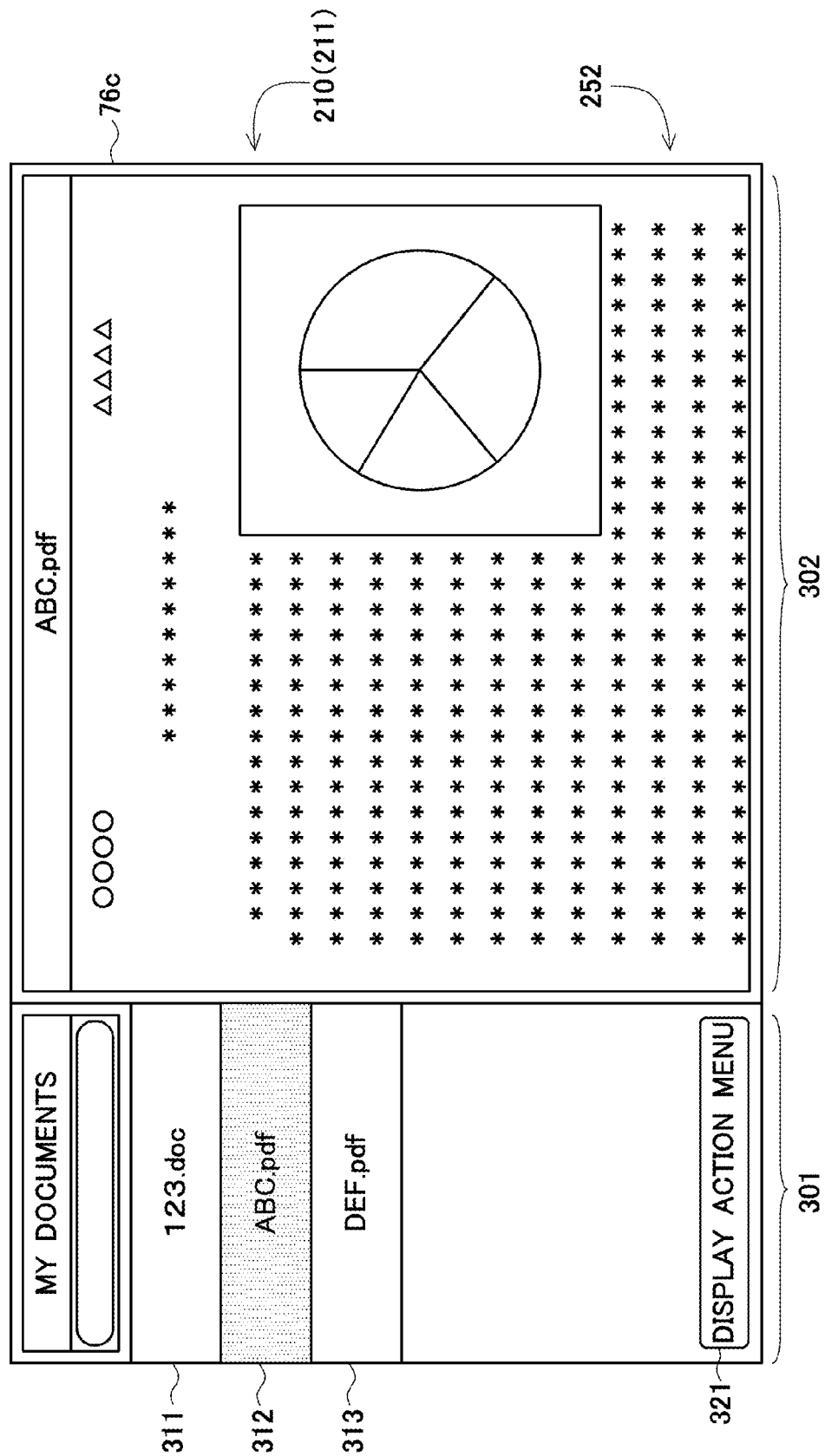
FIG. 5 is a diagram showing a display screen of an electronic document viewing application (a cooperation source application)

FIG. 5 is a diagram showing a display screen 210 (211) of the electronic document viewing application 201. FIG. 5 shows the display screen 210 displayed on the touch screen 76c immediately after the electronic document viewing application 201 is started. As shown in FIG. 5, the display screen 210 of the electronic document viewing application 201 is displayed on the entire touch screen 76c.

As shown in FIG. 5, on the left; side of the display screen 210 of the electronic document viewing application 201 is provided a document selection area 301, and on a part from the center to the right side of the display screen 210 is provided a document viewing area (also referred to as a document content display area or a preview area) 302. In the document selection area 301, there are listed document names of the plurality of documents stored in the portable information terminal 70. When the user selects an item (for example, item 312) corresponding to an intended document from a plurality of items (311, 312, 313, or the like) each corresponding to each of the plurality of documents, a content of the document which is selected (selected document) is displayed in the document viewing area 302. FIG. 5 shows how the content of the selected document "ABC.pdf" is displayed in the document viewing area 302 after the document "ABC.pdf" (item 312) in the document selection area 301 is selected by the user.

Figure 6:
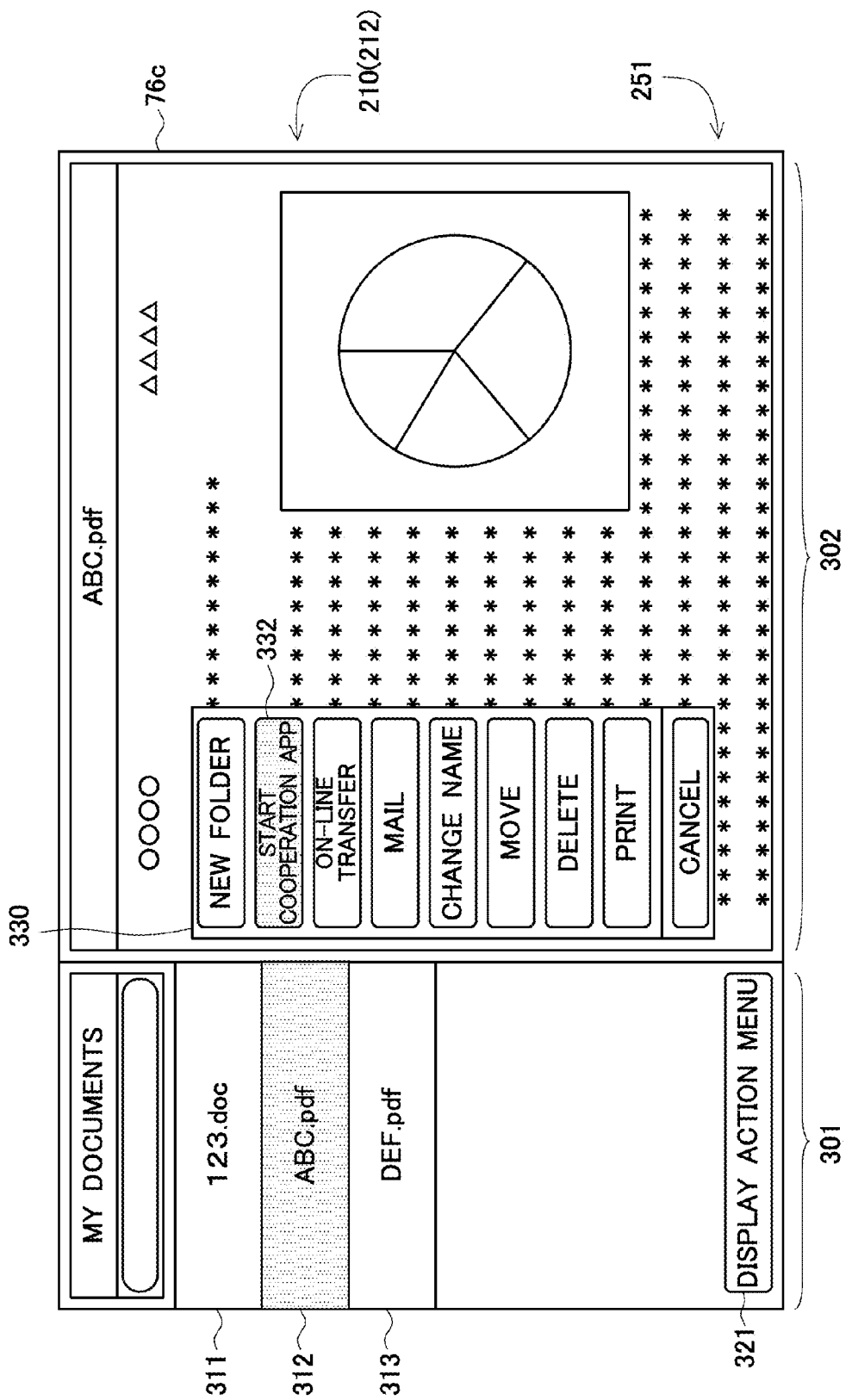
FIG. 6 is a diagram showing the display screen of the electronic document viewing application (a cooperation source application)

In the display screen 210, there is also provided an action menu display button 321. If the user presses down the action menu display button 321, the electronic document viewing application 201 displays the display screen 210 (212) as shown in FIG. 6 on the touch screen 76c (step S12). As shown in FIG. 6, the display screen 212 is a screen in which an action menu 330 is popped up on the display screen 211 (FIG. 5). A display position of the action menu 330 in the display screen 210 is appropriately determined by the cooperation source application 201.

The action menu 330 is a menu screen (menu image) including a plurality of menu items ("New Folder", "Start Cooperation Application", "On-Line Transfer (to Storage)", "Mail", . . . , "Delete", and "Print"). The plurality of menu items include a menu item 332 "Start Cooperation Application." The menu item 332 is a menu item for providing a start instruction which instructs to (call up and) start the cooperation destination application.

In this way, during the execution of the cooperation source application 201 (and just before the start of the cooperation destination application 202), the menu image (action menu 330) including call-up menu items for calling up the application is displayed in the display screen 210 of the cooperation source application 201.

Next, if the menu item 332 "Start Cooperation Application" in the action menu 330 is pressed by the user, the print management application 202 as the cooperation destination application starts. In other words, the cooperation destination application which cooperates with the cooperation source application 201 is called up by the cooperation source application 201 and then start.

The cooperation destination application 202 has, as a "main display area" (360), a display area which is smaller than the entire display area of the display screen of the cooperation source application 201. The main display area 360 is displayed on a part of the touch screen 76c. The main display area 360 is mainly used to perform operations related to the cooperation destination application 202.

Here, assuming a technology (also referred to as a technology related to a comparative example) in which the cooperation destination application 202 is started with only data of a print target document being given to the application 202. In the technology related to the comparative example, for example, a display screen 900 as shown in FIG. 15 is displayed on the touch screen 76c. FIG. 15 is a diagram showing the display screen 900 of the cooperation destination application related to such a comparative example. In the display screen 900 of FIG. 15, in the peripheral area of the main display area 360, a black background image is composited and displayed.

However, when such a monochrome black screen is displayed, the cooperation between the two applications is not sufficiently conveyed to the user.

Figure 7:
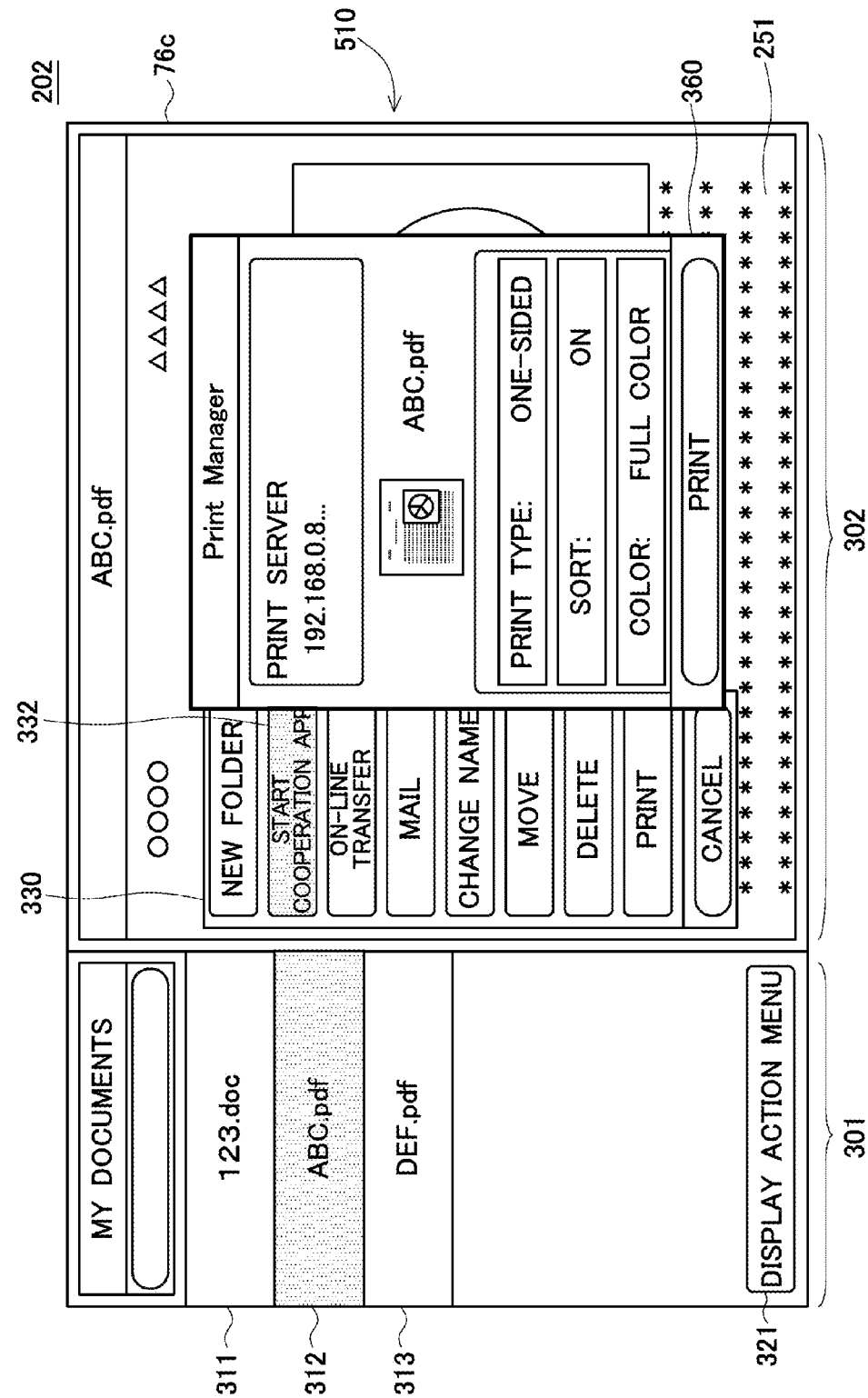
FIG. 7 is a diagram showing a display screen of a cooperation destination application.

In contrast, in the present embodiment, a display screen (start-up screen) 510 (to be described later) of FIG. 7 is displayed on the touch screen 76c. With this screen, it is possible to clearly show that the cooperation source application 201 and the cooperation destination application 202 are cooperating with each other.

Such an operation will be described in detail. If the menu item 332 "Start Cooperation Application" in the action menu 330 is pressed down by the user, and the start instruction (call-up instruction) of the cooperation destination application 202 is provided, the start instruction is received by the input control unit 81, the cooperation source application 201, and the like through the operation input unit 76a (step S13). Then, the process proceeds to step S14.

In step S14, the cooperation source application 201 (image generation unit 85) captures at that time (at the time when start is instructed) the display screen 212 (FIG. 6) displayed on the touch screen 76c to generate a captured image 251. The captured image 251 is an image including the action menu 330 (menu image). In detail, the captured image 251 is an image related to the display screen 212 in which the action menu 330 is displayed in superposition on the document viewing area 302 during the execution of the cooperation source application 201. As described later, the captured image 251 will be used as an image for background for the cooperation destination application 202.

In next step S17, the cooperation source application 201 gives the captured image 251 to the cooperation destination application 202 and starts the cooperation destination application 202. In other words, when the cooperation destination application 202 is started, the captured image 251 is given from the cooperation source application 201 to the cooperation destination application 202. In detail, as an image (image for composition) to be composited and displayed in the peripheral area of the main display area 360 after the start of the cooperation destination application 202, the captured image (image for background) 251 is given from the cooperation source application 201 to the cooperation destination application 202.

Regarding the delivery of data (captured image 251 and the like) as described above, if the applications 201 and 202 operate, for example, on "iOS" (registered trademark), URL Scheme (Uniform Resource Locator Scheme) may be used.

Specifically, when the cooperation destination application is specified and started, URL Scheme has only to specify the data (captured image 251 and the like) to be given to the cooperation destination application 202 as the parameter of URL Scheme. In detail, this URL Scheme is written in a form "(application name)://(parameter)", and is written as "PrintManager://MD=NML&PASTEBOARD=capture1", for example. Here, "PrintManager" is the (name of) cooperation destination application 202 to be started, and "://" is a scheme delimiter. After the scheme delimiter "://", one or more parameters are specified. For example, two parameters are specified, having "&" therebetween. In the above first parameter item "MD=NML", as a parameter for specifying an operation mode "MD" of the application, a parameter value "NML" (representing a normal mode) is specified. In the above second parameter item "PASTEBOARD=capture1", a parameter for specifying an identifier of a pasteboard "PASTEBOARD", a parameter variable "capture1" (a variable of a class related to an image) is specified. The data specified as a content of the parameter item is given from the cooperation source application 201 to the cooperation destination application 202, and the cooperation destination application 202 executes a process using the received data.

In the above example of URL Scheme, based on the specified parameter "PASTEBOARD=capture1", data content (image data) identified by the "capture1" is obtained from the pasteboard (clipboard). In other words, the cooperation destination application 202 receives the data content identified by "capture1" from the cooperation source application 201 through the pasteboard.

Also, in the case of other OSs, according to each OS, the captured image and the like can be given from the cooperation source application 201 to the cooperation destination application 202. For example, on "Android (registered trademark) OS", an explicit intent cooperative processing can be used to specify and start the cooperation destination application, and content provider functions can be used for delivery of data. Further, in the case of the other OSs, a method in conformity to each OS can be used to realize the same operation of delivery.

The delivery of the data directed to the pull-print (electronic document data) is not described in detail here but can be performed in the same or other ways. Specifically, the data directed to the pull-print (electronic document data) can be given from the cooperation source application 201 to the cooperation destination application 202 by using above-described URL Scheme or the like.

In next step S21, the captured image 251 received from the cooperation source application 201 through the pasteboard is used as the background image, and the cooperation destination application 202 is started. Note that, just before the start of the cooperation destination application 202, the cooperation source application 201 shifts to a stand-by state on the background (non-active state). In response to this operation, the display screen 210 of the cooperation source application 201 disappears from the touch screen 76c. Then, instead of the display screen 210, the display screen 510 of the cooperation destination application 202 appears on the touch screen 76c.

FIG. 7 is a diagram showing the display screen (start-up screen) 510 of the cooperation destination application 202. Immediately after the cooperation destination application 202 starts, the display screen 510 as shown in FIG. 7 is displayed on the touch screen 76c.

On the display screen 510, the main display area 360 is displayed. Note that the display position of the main display area 360 in the display screen 510 is controlled to be at an appropriate position by the cooperation destination application 202. FIG. 7 shows that the main display area 360 is displayed at a slightly rightward position in the display screen 510.

In addition, in the peripheral area of the main display area 360 of the cooperation destination application 202, the captured image 251 is displayed (compositely displayed). The image related to the display screen 510 is an image in which the captured image 251 and the images of the main display area 360 are composited such that the image of main display area 360 is superimposed on the captured image 251. In other words, the captured image 251 is used as the background image of the main display area 360 of the cooperation destination application 202.

Then, the started cooperation destination application 202 is used to execute a transfer and storage operation (operation for transferring print data from the portable information terminal 70 to the server 30 and once storing the print data in the server 30) of the print data for pull-print, the transfer and storage operation being a part of the pull-print operation.

After that, the user moves to an installation site of the MFP 10 (print output device) and operates the operation panel 6c of the MFP 10 to log in to the MFP 10. The MFP 10 obtains (pulls) the print data, of the log-in user, directed to the pull-print from the server 30 and prints out (prints) based on the print data.

In the display operation as described above, the image for background (captured image 251), for the cooperation destination application, generated by capturing the display screen 212 of the cooperation source application 201 is given from the cooperation source application 201 to the cooperation destination application 202 as the image for composition to be compositely displayed in the peripheral area of the main display area 360 of the cooperation destination application 202. In addition, in the cooperation destination application 202, the captured image 251 given from the cooperation source application 201 is displayed (compositely displayed) in the peripheral area of the main display area 360 after the cooperation destination application 202 starts (see FIG. 7). Thus, the cooperation between the cooperation source application 201 and the cooperation destination application 202 can be understandably presented to the user. In more detail, it is possible to understandably show that the cooperation source application 201 and the cooperation destination application 202 are cooperating with each other.

In particular, in the display screen 510 of the cooperation destination application 202, a document name (the item 312) related to a cooperation target data (document of a pull-print target) and a content (document content display area 302) of the document are displayed (but partially) in the peripheral area of the main display area 360. Thus, the target data is easily identified in the cooperating operation between the cooperation source application 201 and the cooperation destination application 202.

In particular, because the image having the menu image including the call-up menu items is generated as the image for background, it is possible to more understandably present the cooperation between the two applications.

In detail, the action menu 330 having "Start Cooperation Application" (call-up menu item) is included in the captured image 251, and the captured image 251 is displayed in the peripheral area of the main display area 360 of the cooperation destination application 202 (see FIG. 7). In other words, the menu image including the call-up menu items is displayed just before the cooperation destination application 202 starts (and during the execution of the cooperation source application 201), and the menu image including the call-up menu items is displayed also after the cooperation destination application 202 starts. Thus, it is easily understood that the cooperation destination application 202 is called up (started) in response to the selection of the call-up menu item in the action menu 330 having been displayed by the cooperation source application 201.

Further, because the image having the menu image with the call-up menu item being selected is generated as the image for background, the cooperation between the two applications can be more understandably presented.

In detail, in the action menu 330, highlight (for example, displaying in yellow or the like (in FIG. 7, displaying by hatching)) indicates that the call-up menu item "Start Cooperation Application" is being selected (selected state). Then, as the background image of the cooperation destination application 202, the captured image 251 is displayed, including the action menu 330 (menu image) with the call-up menu item "Start Cooperation Application" being selected. Thus, it is easily understood that "Start Cooperation Application" in the action menu 330 is selected and the cooperation destination application 202 has been called up.

<2. Second Embodiment>

In the first embodiment, the aspect is exemplified in which the image including the action menu 330 displayed in the cooperation source application 201 is displayed in the periphery of the main display area 360 of the cooperation destination application 202; however, the present invention is not limited thereto.

Figure 8:
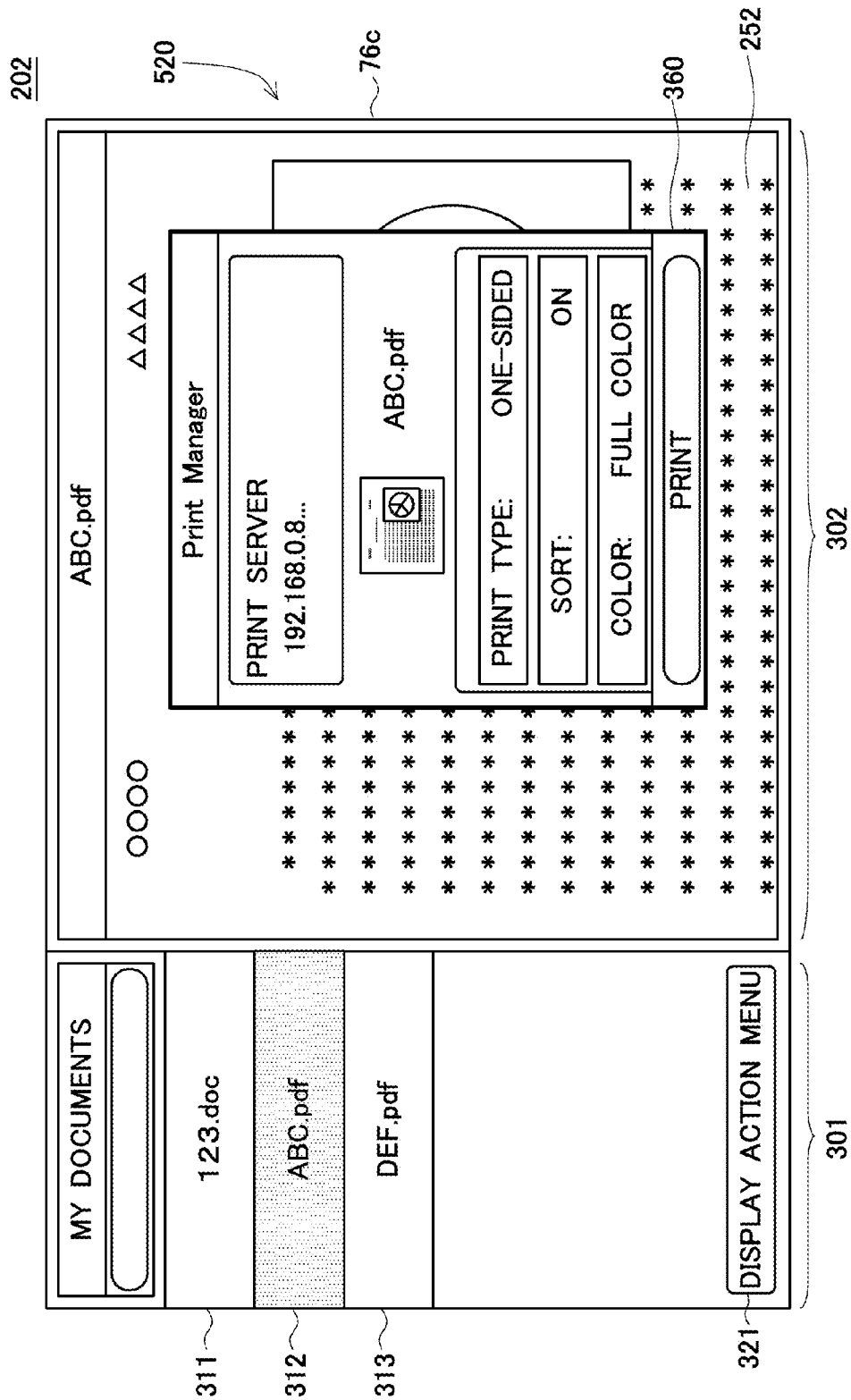
FIG. 8 is a diagram showing a display screen of a cooperation destination application according to a second embodiment.

For example, an image not including the action menu 330 displayed in the cooperation source application 201 may be displayed in the periphery of the main display area 360 of the cooperation destination application 202 (see FIG. 8).

Such an aspect will be described in a second embodiment. The second embodiment is a modified example of the first embodiment, and a description will be made below mainly on the differences from the first embodiment.

FIG. 8 is a diagram showing a display screen 520 when a cooperation destination application 202 according to the second embodiment has started.

As can be understood by comparing FIG. 8 with FIG. 7, in the display screen 520 (FIG. 8), the action menu 330 is not displayed.

Figure 9:
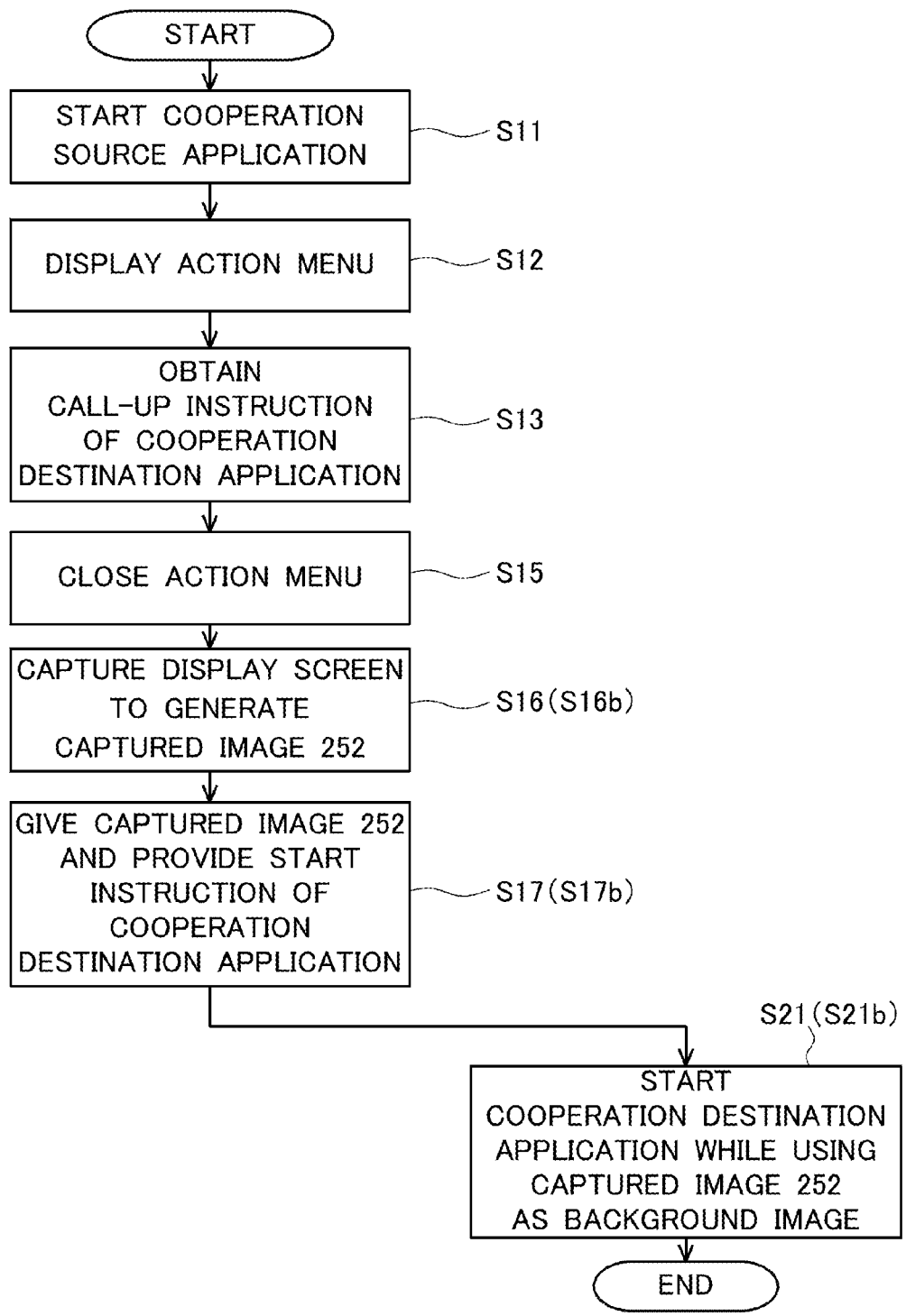
FIG. 9 is a flowchart showing an operation according to the second embodiment.

FIG. 9 is a flowchart showing an operation according to the second embodiment.

As shown in FIG. 9, in the same way as the first embodiment, step S11, S12, and S13 are first executed. However, without executing step S14 (FIG. 4), the process proceeds to step S15.

In step S15, the cooperation source application 201 closes the action menu 330 (step S15). By this operation, on the touch screen 76*c*, the display screen 211 of FIG. 5 is displayed again instead of the display screen 212 of FIG. 6. The cooperation source application 201 captures the re-displayed display screen 211 to generate a captured image 252 (step S16 (S16*b*)).

The captured image 252 does not include the action menu 330 (menu image). The captured image 252 includes the image of the document viewing area 302 (also referred to as a document content display image) which has been displayed before the action menu 330 is displayed in superposition during the execution of the cooperation source application 201. Briefly speaking, the captured image 252 is an image in which the action menu 330 is removed from the captured image 251. Note that, in the part from which the action menu 330 has been removed, an image of the document viewing area 302 before the action menu 330 is displayed in superposition is displayed.

Then, in step S17 (S17*b*), a start instruction of the cooperation destination application 202 is provided. At this time, the captured image 252 (see FIG. 5) obtained in step S16 (S16*b*) is given to the cooperation destination application 202 as the parameter.

In step S21 (S21*b*), the cooperation destination application 202 starts, using the captured image 252 (FIG. 5) given from the cooperation source application 201 as the background image. Note that, just before the cooperation destination application 202 starts, the cooperation source application 201 shifts to the stand-by state on the background. In response to this operation, display screen of the cooperation source application 201 disappears from the touch screen 76*c*, and instead, a display screen of the cooperation destination application 202 appears on the touch screen 76*c*.

FIG. 8 is a diagram showing the display screen (start-up screen) 520 of the cooperation destination application 202. As shown in FIG. 8, after the cooperation destination application 202 starts, the captured image 252 is displayed (compositely displayed) in the peripheral area of the main display area 360 of the cooperation destination application 202. The image related to the display screen 520 is an image in which the captured image 252 and the image of the main display area 360 are composited such that the image of the main display area 360 is superimposed on the captured image 252. In other words, the captured image 252 is used as the background image of the image of the main display area 360 of the cooperation destination application 202.

In the operation as described above, after the cooperation destination application 202 starts, the captured image 252 (FIG. 5) of the display screen of the cooperation source application 201 is displayed (compositely displayed) in the peripheral area of the main display area 360 of the cooperation destination application 202. Thus, it is easily understood that the cooperation source application 201 and the cooperation destination application 202 are cooperating with each other.

In particular, even if the action menu 330 is displayed in superposition in the document viewing area 302 while the cooperation source application 201 is being executed and just before the cooperation destination application 202 starts, on the display screen 520 immediately after the cooperation destination application 202 starts, the action menu 330 is not shown and the content of the document viewing area 302 having been hidden by the part in which the action menu 330 has been superimposed can be displayed. Therefore, on the display screen 520 immediately after the cooperation destination application 202 starts, the content of the document viewing area 302 which has been displayed in the cooperation source application 201 before the cooperation destination application 202 is started can be understandably displayed without being hidden by the action menu 330. Briefly speaking, because the action menu 330 is not displayed, decrease in visibility of the document content can be reduced.

<3. Third Embodiment>

A third embodiment is a modified example of the first embodiment, and a description will be made below mainly on the differences from the first embodiment.

In the above first embodiment, the captured image 251 (FIG. 6) is used to generate the display screen 510 (FIG. 7) of the cooperation destination application 202; and in the above second embodiment, the captured image 252 (FIG. 5) is used to generate the display screen 520 (FIG. 8) of the cooperation destination application 202.

In the third embodiment, the aspect is exemplified in which the two captured images 251 and 252 are both given to the cooperation destination application 202 as candidates for the image for background, and one of the two captured images 251 and 252 is employed (selected) by the cooperation destination application as an actual image for background after the cooperation destination application starts.

Figure 10:
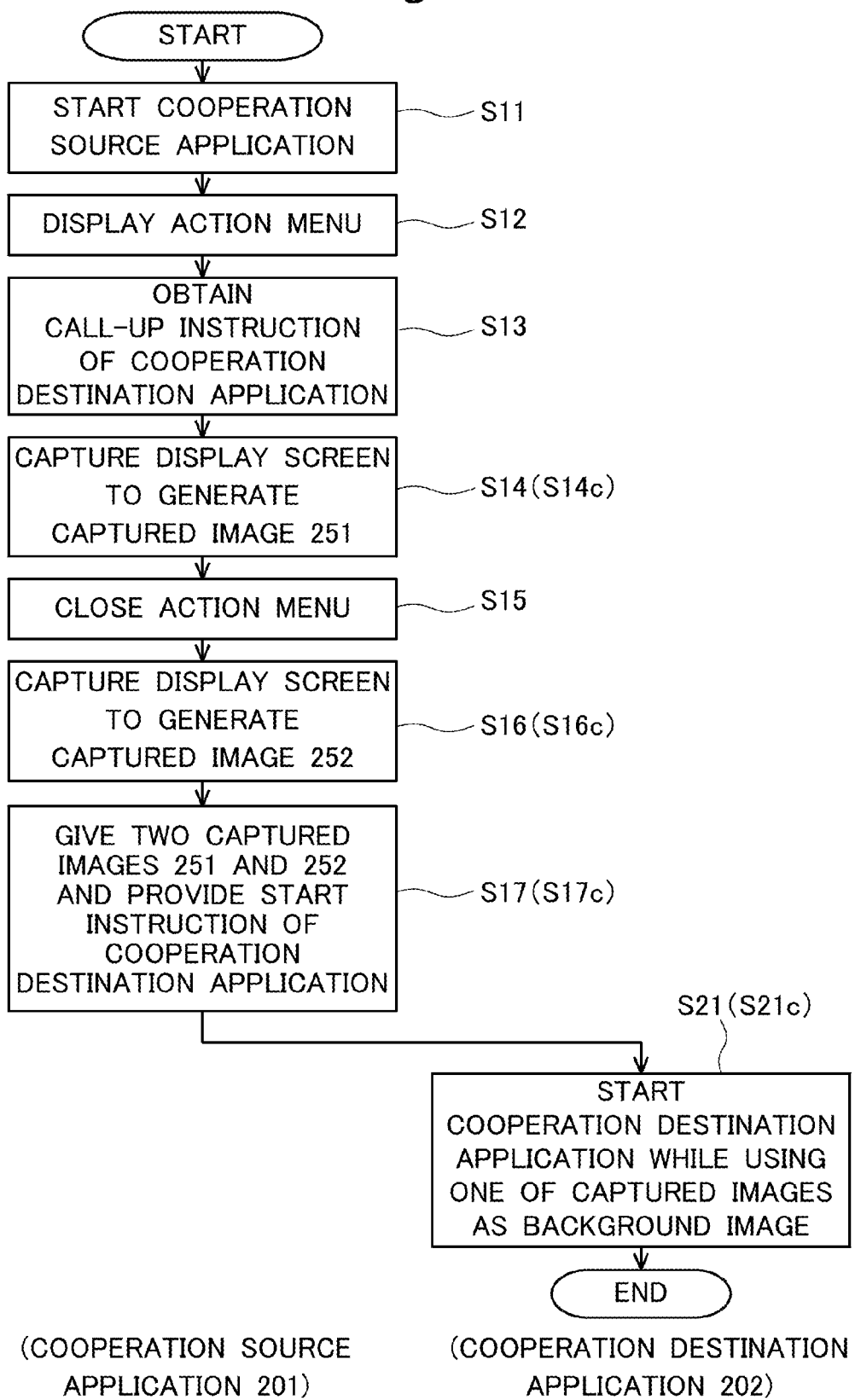
FIG. 10 is a flowchart showing an operation according to a third embodiment.

FIG. 10 is a flowchart showing an operation according to the third embodiment.

In FIG. 9, step S11 to step S14 are the same as the first embodiment. In step S14 (S14c), the display screen 212 of FIG. 6 is captured to generate the captured image 251. The captured image 251 is an image including the action menu 330 (menu image).

Next, the cooperation source application 201 closes the action menu 330 (step S15) and captures the display screen 211 (see FIG. 5) to generate the captured image 252 (step S16 (S16c)). The captured image 252 includes the image of the document viewing area 302 before the action menu 330 is displayed in superposition and does not includes the action menu 330 (menu image).

In this way, as the candidates for the image to be actually used to be the image for background by the cooperation destination application 202, the both images of the captured image 251 and the captured image 252 are generated (steps S14 and S16).

Then, in step S17 (S17c), a start instruction of the cooperation destination application 202 is provided. At this time, both of the captured image 251 and the captured image 252 are given to the cooperation destination application 202 as a parameter.

In step S21 (S21c), the cooperation destination application starts, using one of the both captured images 251 and 252 as the background image.

For example, assuming the case that the cooperation destination application 202 has previously decided to always use the captured image 252 as the background image, such a screen as shown in FIG. 8 is displayed after the cooperation destination application 202 starts.

On the other hand, assuming the case that another cooperation destination application 203 (not shown) has previously decided to always use the captured image 251 as the background image, the cooperation destination application 203 called up by the cooperation source application 201 always uses the captured image 251 as the background image. In this case, a screen similar to FIG. 7 is displayed after the cooperation destination application 203 starts. Because the screen does not include the action menu 330, it is relatively easy for the user to visually recognize a content of the document. Note that, a display content, a display position, a display size, and the like of the main display area 360 of the cooperation destination application 203 may be different from those in FIG. 7, depending on types or the like of the cooperation destination application 203.

By such an operation, when the cooperation destination application 202 (or 203) is started, the two captured images 251 and 252 are given to the cooperation destination application. Then, the cooperation destination application (display control unit 82 or the like) determines the captured image to actually use as the background image, and uses the determined captured image (image for background) as the background image to display in the peripheral area of the main display area 360 of the cooperation destination application. Therefore, it is possible to display, in the cooperation destination application, an appropriate image for background depending on the selection of the cooperation destination application.

Hear, the aspect is exemplified in which each of the cooperation destination applications 202 and 203 fixedly uses corresponding one of the captured images 251 and 252 which are received; however, the present invention is not limited thereto. It may be possible to selectively use one captured image which is selected (based on an appropriate condition or the like) from the two captured images 251 and 252 which are received by the cooperation destination application 202 cooperating with the operation source application 201.

<4. Fourth Embodiment>

In the above third embodiment, the aspect is exemplified in which the two types of captured images 251 and 252 corresponding to presence or absence of the action menu 330 (menu image) are given to the cooperation destination application; however, the present invention is not limited thereto. For example, two types of the captured images 251 and 253 (to be described later) corresponding to an orientation of the display of the portable information terminal 70 may be given to the cooperation destination application.

Note that the portable information terminal 70 can perform a "portrait display" which displays a vertically long image when the touch screen 76c having an approximately rectangular shape is used in a vertical orientation (vertically), and can perform a "landscape display" which displays a horizontally long image when the touch screen 76c is used in a horizontal orientation (horizontally). Switching between the "portrait display" and "landscape display" is conducted, for example, when the orientation of the portable information terminal 70 detected by a sensor (posture detection sensor or the like) built in the portable information terminal 70 is changed to the horizontal orientation or the vertical orientation. Alternatively, the switching between the "portrait display" and the "landscape display" may be conducted according to an explicit button operation or the like by an operator.

Figure 13:
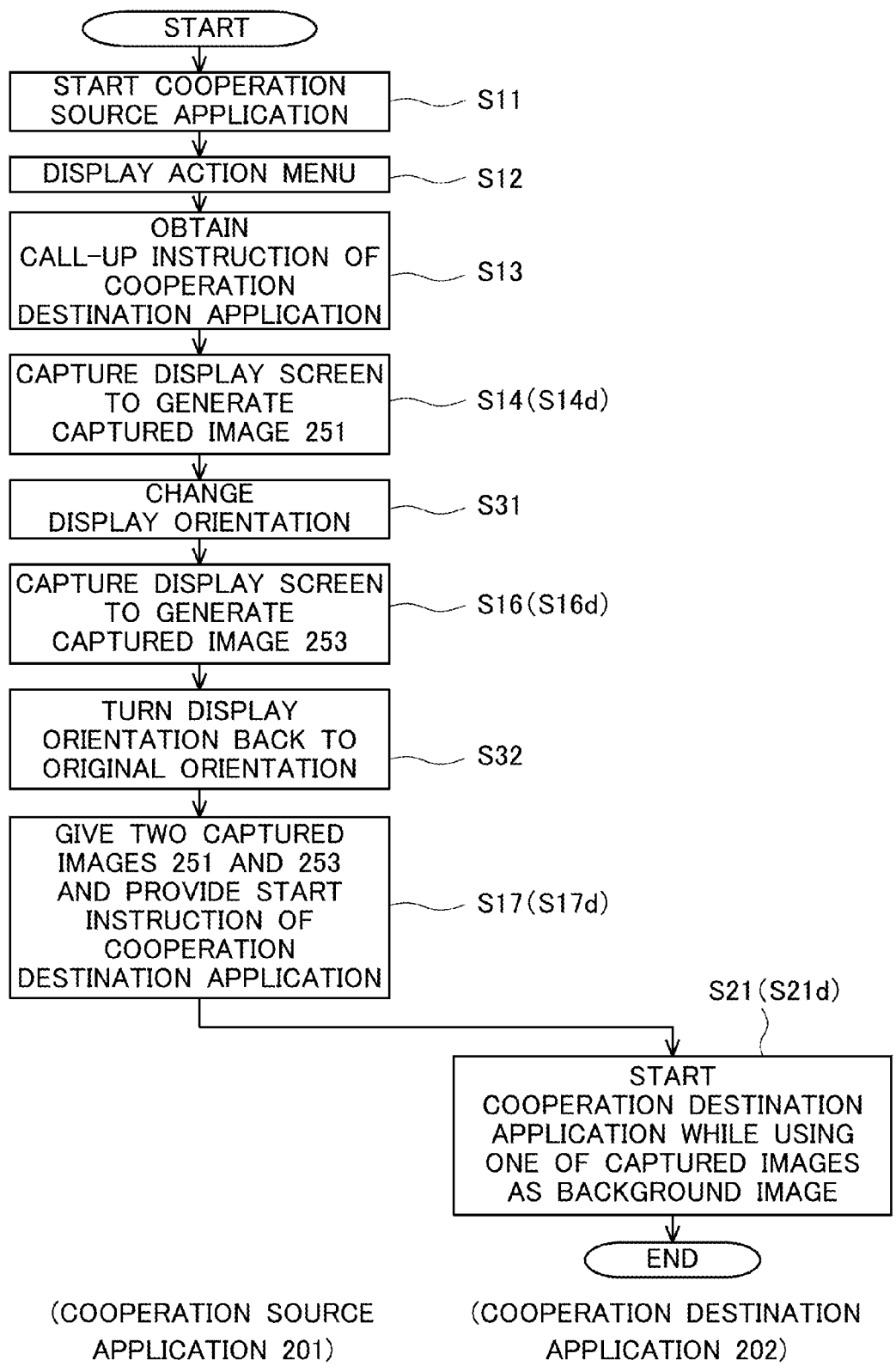
FIG. 13 is a flowchart showing an operation according to a fourth embodiment.

In the fourth embodiment, an operation is performed as shown in FIG. 13. Here, the portable information terminal 70 originally performs the "landscape display."

In detail, when the portable information terminal 70 performs the landscape display, a captured image 251 is obtained in the same way as the above first embodiment (steps S11 to S14).

Figure 11:
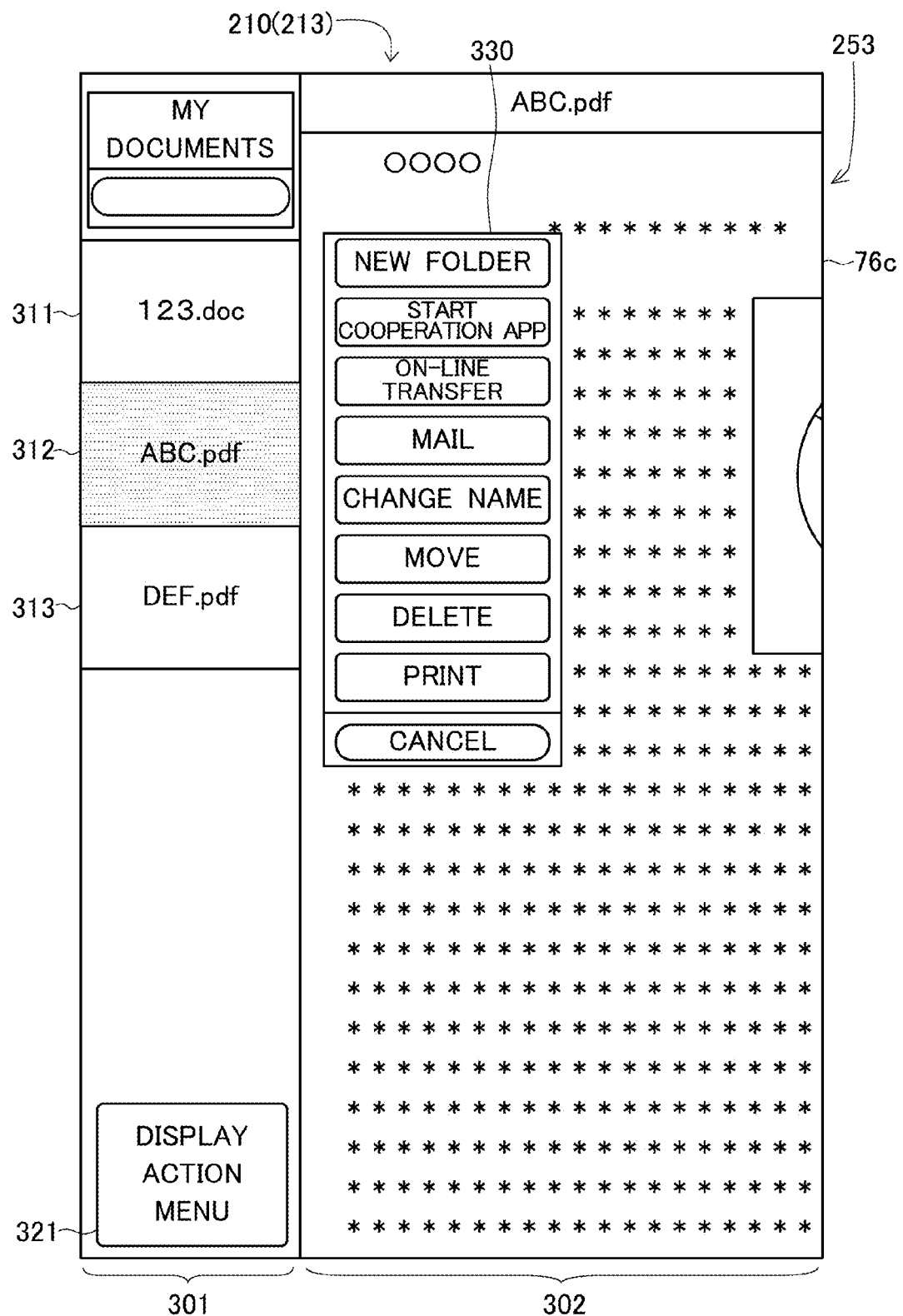
FIG. 11 is a diagram showing a captured image corresponding to a portrait display.

Then, before the cooperation source application 201 is switched to the cooperation destination application 202, the following operation is executed. Specifically, the portable information terminal 70 forcibly changes the display orientation from "horizontal" to "vertical" (step S31), and captures a display screen 213 (FIG. 11) in the portrait display in the cooperation source application 201 to generate a captured image 253 (step S16d). Note that the display orientation of the touch screen 76c is returned to the original display orientation (horizontal) after the captured image 253 is generated (step S32).

In this way, as a candidate for the image for background to be actually used to be the background image in the cooperation destination application 202, both of the captured image 251 and the captured image 253 are generated (steps S14 and S16). Note that the captured image 251 is also referred to as an image for the landscape display on the touch screen 76c, and the captured image 253 is also referred to as an image for the portrait display on the touch screen 76c.

Then, when the cooperation destination application 202 is started, the two captured images 251 and 253 are both given from the cooperation source application 201 to the cooperation destination application 202 (step S17d). This operation of giving the images is executed by the image generation unit 85 and the like.

The cooperation destination application 202 uses one captured image, of the two captured images 251 and 253, corresponding to the direction of the touch screen 76c as the background image to generate a composite image, and display the generated composite image on the touch screen 76c (step S21d).

For example, if the portable information terminal 70 is (still) performing the "landscape display", the cooperation destination application 202 uses the captured image 251 corresponding to the landscape display as the background image to generate a composite image, and displays the composite image on the touch screen 76c. By this operation, when the "landscape display" is performed on the touch screen 76c, the display screen 520, which is similar to FIG. 7, is displayed as an initial screen of the cooperation destination application 202.

Figure 12:
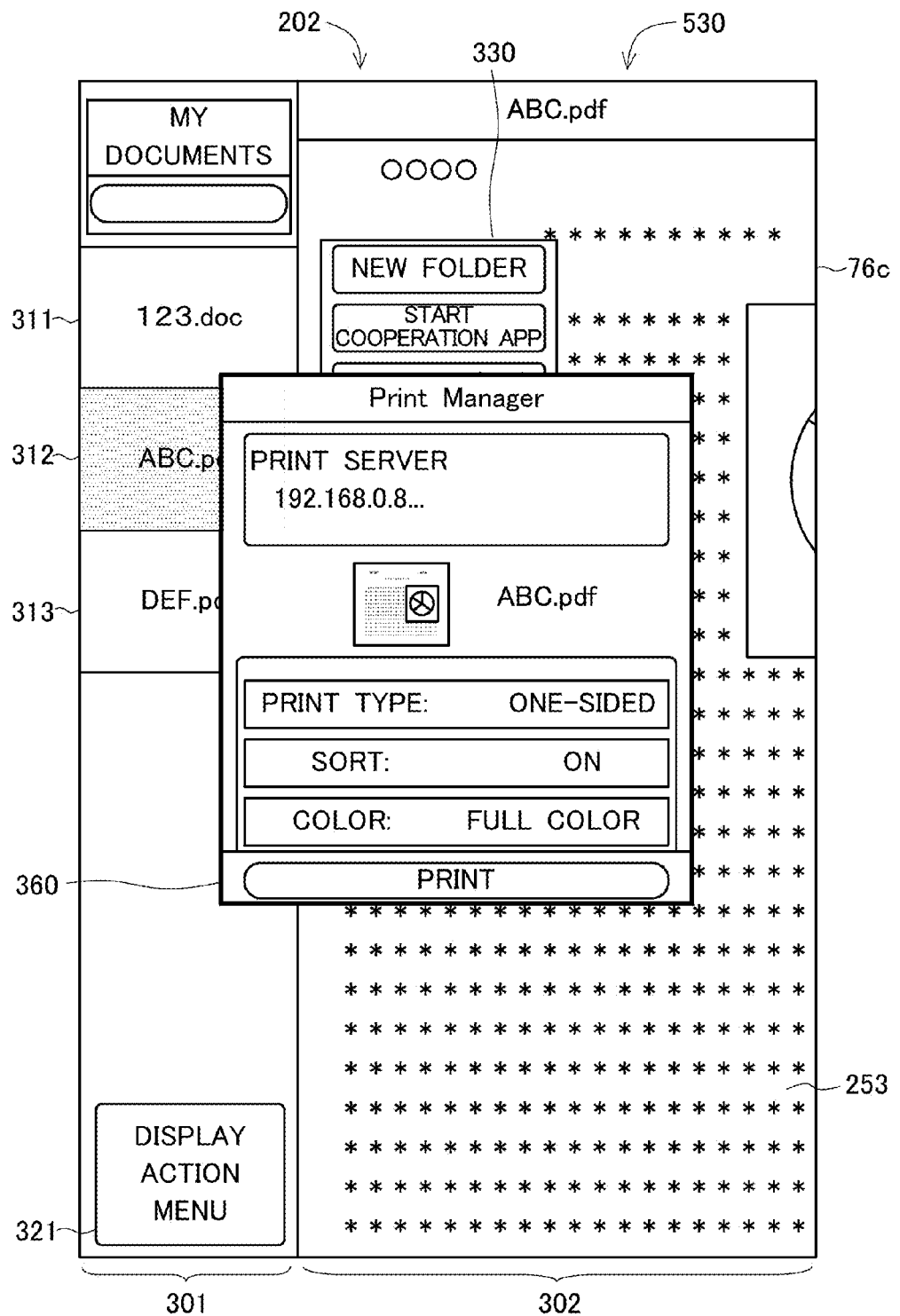
FIG. 12 is a diagram showing a start-up screen for the portrait display of the cooperation destination application.

On the other hand, for example, if the portable information terminal 70 is rotated by the user, and it is detected by a posture detection sensor built in the portable information terminal 70 that the orientation of the portable information terminal 70 is changed from "horizontal" to "vertical", the following operation is executed. That is to say, the cooperation destination application 202 uses the captured image 253 (FIG. 11) corresponding to the portrait display as the background image to generate a composite image, and displays the composite image on the touch screen 76c. By this operation, when the "portrait display" is performed on the touch screen 76c, a display screen (start-up screen) 530 as shown in the FIG. 12 is displayed as the initial screen of the cooperation destination application 202. FIG. 12 is a diagram showing the display screen 530 for the portrait display of the cooperation destination application 202.

By such an operation as described above, when the cooperation destination application 202 is started, displayed is the composite image generated by using one captured image, of the two captured images 251 and 253, corresponding to the display orientation on the portable information terminal 70. Specifically, when the landscape display is performed on the touch screen 76c, the captured image 251 is used as the image for background, and the touch screen 76c displays thereon the composite image in which the captured image 251 is used as the background image of the main display area 360 (FIG. 7). On the other hand, when the portrait display is performed on the touch screen 76c, the captured image 253 (FIG. 11) is used as the image for background, and the touch screen 76c displays thereon the composite image (display screen 530) in which the captured image 253 is used as the background image of the main display area 360 (see FIG. 12).

Therefore, an appropriate captured image is used which corresponds to the display orientation of the portable information terminal 70 at the time when the display screen of the cooperation destination application 202 is displayed, and an appropriate image can thus be displayed on the touch screen 76c. In other words, in the cooperation destination application 202, it is possible to display an appropriate image for background corresponding to the display orientation of the portable information terminal 70. In particular, in the cooperation destination application 202, even in the case that switching is conducted between the landscape display and the portrait display, it is possible to display an appropriate image for background corresponding to each display.

<5. Modified Example and the Like>

The embodiments of the present invention have been described above; however, the present invention is not limited to the above-described contents.

For example, in the above first embodiment and the like, the main display area 360 of the cooperation destination application 202 is disposed adjacent to the action menu 330; however, this is not restrictive, and the main display area 360 can be disposed at any position. Specifically, as shown in FIG. 14, the main display area 360 may be disposed with a small space between itself and the action menu 330, and a menu image 380 of the cooperation destination application 202 may be displayed in the space. In FIG. 14, the menu image 380 in the cooperation destination application 202 has the two menu items ("Print Setup" and "Server Setup") of the cooperation destination application 202. With this display, because the action menu 330 (menu image) of the cooperation source application 201 and the menu image 380 of the cooperation destination application 202 are disposed side by side, it is possible to understandably display the contents of the menus of the two applications 201 and 202 which cooperate with each other. FIG. 14 shows an aspect in which the action menu 330 is displayed further to the left (compared to FIG. 6), by the cooperation source application 201.

In addition, in the above fourth embodiment, an aspect is described in which the two composite images (display screens 510 and 530) respectively corresponding to the two display orientations ("horizontal" and "vertical") are generated by using the captured images 251 and 253 including the action menu 330; however, the present invention is not limited thereto.

For example, the captured images 252 and 254 (not shown), which do not include the action menu 330, may be used to generate two composite images (display screens 520 and 540 (not shown)) respectively corresponding to the two display orientations. Here, the captured image 254 is an image for the portrait display and is an image which does not include the action menu. The display screen 540 is a screen on which a composite image based on the captured image 254 is displayed.

Further, a spirit according to the fourth and a sprit according to the third embodiment may be combined. For example, the above four captured images 251, 252, 253, and 254 may be given, when the cooperation destination application is stated. Then, also based on the display orientation of the portable information terminal 70, the cooperation destination application may display the composite image by using one captured image selected from the four captured image 251 to 254.

Further, in the above embodiment, as the cooperation source application, an electronic document viewing application is exemplified; and as the cooperation destination application, a print management application is exemplified; however, the present invention is not limited thereto, and each application may be any of various applications. For example, the cooperation source application may be a scanning application, and the cooperation destination application may be an OCR (Optical Character Recognition) application.

While the invention has been shown and described in detail, the foregoing description is in all aspects illustrative and not restrictive. It is therefore understood that numerous modifications and variations can be devised without departing from the scope of the invention.

What is claimed is:

1. A portable information terminal which is capable of exclusively displaying a display screen based on a single application from among display screens of a plurality of applications, the portable information terminal comprising:
a display unit that displays a display screen of a cooperation source application;
a receiving unit that receives a start instruction which instructs to start a cooperation destination application cooperating with the cooperation source application; and
a generation unit that generates, based on the start instruction, an image for background for the cooperation destination application by capturing the display screen of the cooperation source application,
wherein the cooperation destination application has, as a main display area, a display area which is smaller than an entire display area of the display screen of the cooperation source application, and
the display unit displays, as the main display area for the cooperation destination application, the display area for the cooperation destination application, and displays, as the image for background of the cooperation destination application, the display screen of the cooperation source application, at a time when the cooperation destination application starts, in a peripheral area of the main display area of the cooperation destination application after the cooperation destination application starts.

2. The portable information terminal according to claim 1, wherein
the display unit displays, in the display screen of the cooperation source application, a menu image including a call-up menu item for calling up an application while the cooperation source application is being executed and just before the cooperation destination application starts,
the generation unit generates, as the image for background, an image including the menu image, and
the display unit displays the image for background in the peripheral area of the main display area of the cooperation destination application after the cooperation destination application starts.

3. The portable information terminal according to claim 2, wherein
the generation unit generates, as the image for background, an image including the menu image in which the call-up menu item in a selected state is shown, and
the display unit displays the image for background in the peripheral area of the main display area of the cooperation destination application after the cooperation destination application starts.

4. The portable information terminal according to claim 1, wherein
the cooperation source application has a document content viewing function,
the display unit displays a menu image including a call-up menu item for calling up an application in superposition on a document content display image in the cooperation source application while the document content viewing function of the cooperation source application is being executed and just before the cooperation destination application starts,
the generation unit generates, as the image for background, an image which includes the document content display image before the menu image is displayed in superposition and which does not include the menu image, and
the display unit displays the image for background in the peripheral area of the main display area of the cooperation destination application after the cooperation destination application starts.

5. The portable information terminal according to claim 1, wherein
the cooperation source application has a document content viewing function,
the display unit displays a menu image including a call-up menu item for calling up an application in superposition on a document content display image in the cooperation source application while the document content viewing function of the cooperation source application is being executed and just before the cooperation destination application starts,
the generation unit generates, as candidates for the image for background, two images including:
a first image which is related to the display screen of the cooperation source application and includes the menu image; and
a second image which is related to the display screen of the cooperation source application, has the document content display image before the menu image is displayed in superposition, and does not has the menu image, and
the display unit displays an image selected as the image for background by the cooperation destination application from the two images given from the cooperation source application to the cooperation destination application at a time when the cooperation destination application starts, in the peripheral area of the main display area of the cooperation destination application.

6. The portable information terminal according to claim 1, wherein
the generation unit generates, as candidates for the image for background, two images including: a first image for a landscape display on the display unit; and a second image for a portrait display on the display unit, and the generation unit gives the two images from the cooperation source application to the cooperation destination application at a time when cooperation destination application starts, and
the display unit uses
the first image as the image for background in a case that a landscape display is performed on the display unit after the cooperation destination application starts, and
the second image as the image for background in a case that a portrait display is performed on the display unit after the cooperation destination application starts.

7. A non-transitory computer-readable recording medium storing a program to be executed on a portable information terminal which is capable of exclusively displaying a display screen based on a single application from among display screens of a plurality of applications, the program causing a computer to execute the steps of:
(a) displaying a display screen in a cooperation source application on a display unit of the portable information terminal, the cooperation source application being the program;
(b) generating an image for background for a cooperation destination application by capturing the display screen in the cooperation source application, based on a start instruction which instructs to start the cooperation destination application cooperating with the cooperation source application; and (c) giving the image for background to the cooperation destination application as an image for composition to be compositely displayed in the peripheral area of the main display area of the cooperation destination application at a time when the cooperation destination application starts, the cooperation destination application having, as a main display area, a display area which is smaller than an entire display area of the display screen in the cooperation source application, wherein the display screen displays, as the main display area for the cooperation destination application, the display area for the cooperation destination application, and displays, as the image for background of the cooperation destination application, the display screen of the cooperation source application.

8. The non-transitory computer-readable recording medium according to claim 7, wherein
in the step (a), a menu image including a call-up menu item for calling up an application is displayed in the display screen in the cooperation source application while the cooperation source application is being executed and just before the cooperation destination application starts, and
in the step (b), an image including the menu image is generated as the image for background.

9. The non-transitory computer-readable recording medium according to claim 8, wherein
in the step (b), an image including the menu image which shows that the call-up menu item is selected is generated as the image for background.

10. The non-transitory computer-readable recording medium according to claim 7, wherein
the cooperation source application has a document content viewing function,
in the step (a), a menu image including a call-up menu item for calling up an application is displayed in superposition on the document content display image in the cooperation source application while the document content viewing function of the cooperation source application is being executed and just before the cooperation destination application starts, and
in the step (b), as the image for background an image is generated which includes the document content display image before the menu image is displayed in superposition and which does not include the menu image.

11. A non-transitory computer-readable recording medium storing a program to be executed on a portable information terminal which is capable of exclusively displaying a display screen based on a single application from among display screens of a plurality of applications, the program causing a computer to execute the steps of:

(a) receiving an image for background which is generated for the program by capturing a display screen in a cooperation source application which cooperates with the program and is different from the program, from the cooperation source application at a time when the program, which is a cooperation destination application, starts; and (b) displaying the image for background in a peripheral area of a main display area of the program after start of the program which has, as the main display area, a display area which is smaller than an entire display area of the display screen in the cooperation source application, wherein the display screen displays, as the main display area for the cooperation destination application, the display area for the cooperation destination application, and displays, as the image for background of the cooperation destination application, the display screen of the cooperation source application.

12. The non-transitory computer-readable recording medium according to claim 11, wherein
the step (a) includes the step of:
(a-1) receiving, as candidates for the image for background, a plurality of images related to the display screen in the cooperation source application,
the plurality of images include:
a first image related to a display screen in which a menu image including a call-up menu item for calling up an application is displayed in superposition on a document content display image in the cooperation source application during the execution of the cooperation source application; and
a second image which includes the document content display image having been displayed before the menu image is displayed in superposition during the execution of the cooperation source application, and which does not include the menu image, and
in the step (b), an image, which is selected as the image for background from the plurality of images by the cooperation destination application, is displayed in the peripheral area of the main display area of the cooperation destination application.

13. The non-transitory computer-readable recording medium according to claim 11, wherein
the step (a) includes the step of:
(a-1) receiving, as candidates for the image for background, a plurality of images related to the display screen in the cooperation source application,
the plurality of images include:
a first image related to a display screen when landscape display is being performed in the cooperation source application; and
a second image related to a display screen when portrait display is being performed in the cooperation source application, and
in the step (b),
when landscape display is performed in the cooperation destination application, the first image in the plurality of images is used as the image for background;
when portrait display is performed in the cooperation destination application, the second image in the plurality of images is used as the image for background.

* * * * *